INVENTOR
RALPH V. HIGGINS
ATTORNEY

Patented Oct. 10, 1950

2,524,796

UNITED STATES PATENT OFFICE 2,524,796

SPRINKLING DEVICE OPERATED BY THE SUN'S RAYS

Ralph V. Higgins, San Francisco, Calif.

Application December 27, 1946, Serial No. 718,725

3 Claims. (Cl. 236—80)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to a mechanism which is actuated by the rays of the sun.

The sun's rays may be utilized to start and stop the operation of a mechanical or electrical device so that such device may be caused to operate for a predetermind length of time during any part of the day that the sun is shining by the provision of instrumentalities which constitute the subject-matter of this invention.

In the accompanying drawing, I have, as an example, illustrated the invention arranged in connection with a lawn sprinkling system whereby the sprinkling system may be automatically started in operation at any predetermined time of day that the sun is shining and be caused to continue in operation for any predetermined interval of time thereafter and then automatically stopped.

In said drawing.

Like numerals of reference indicate the same parts throughout the several figures, in which.

Figures 1, 2, 3, 4, 5, 6:
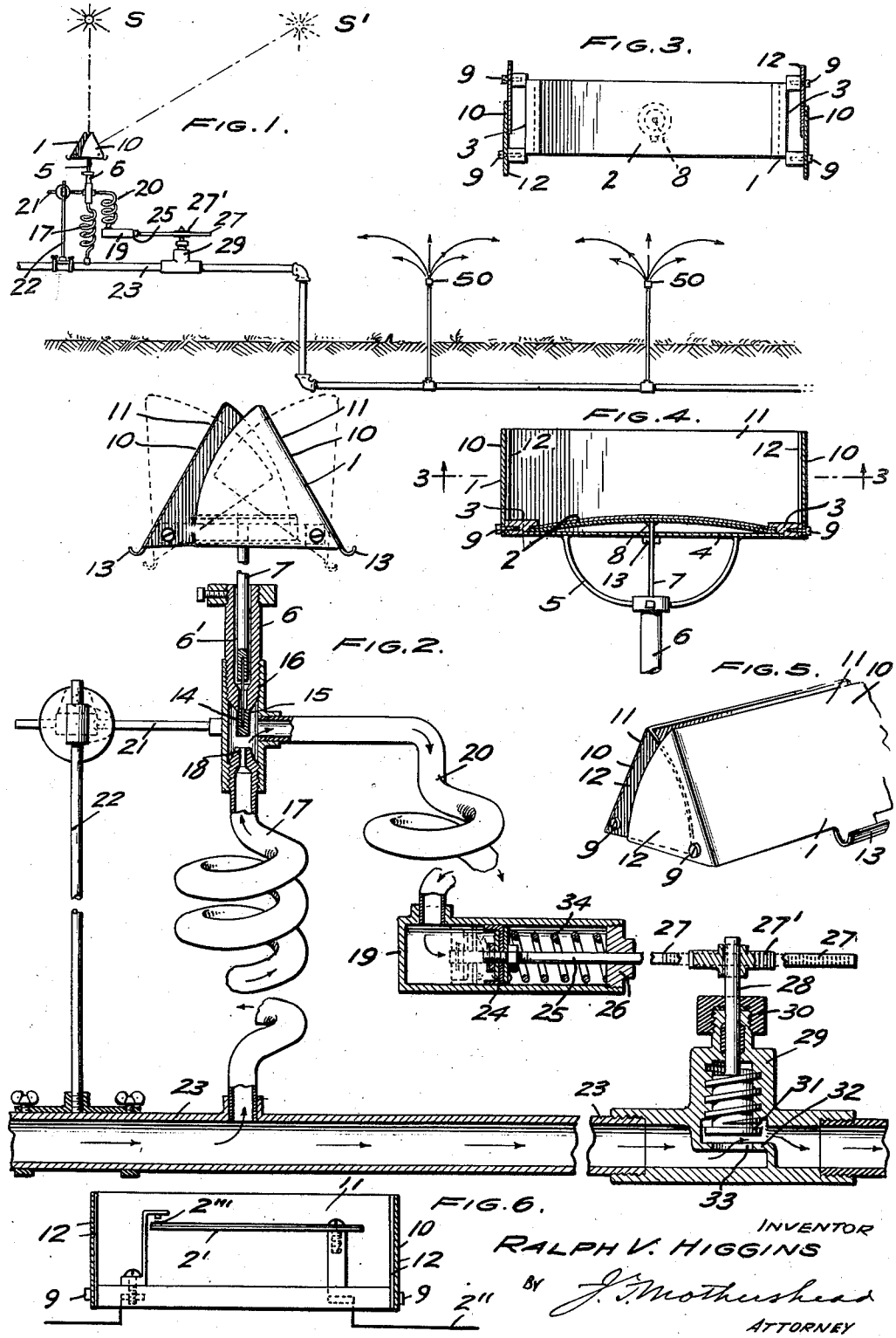
Fig. 1 is a diagrammatic view of my invention arranged in connection with a lawn sprinkling system.
Fig. 2 is a vertical sectional view through the same.
Fig. 3 is a horizontal sectional view through the thermostat mask taken on line 3—3 of Fig. 4, and showing the thermostat in plan.
Fig. 4 is a vertical longitudinal sectional view through the thermostat and its mask and illustrating the thermostat mounting.
Fig. 5 is a fragmentary perspective view of the thermostat mask.
Fig. 6 is a vertical longitudinal view through a modified form of thermostat and its mask.

I indicates the device which includes a thermostat 2 which may be of any type, form or construction, but which in the example shown is of the flat bi-metal type.

The thermostat 2 is mounted in end frame pieces 3 which are connected together by a connecting piece 4 located under the thermostat 2, as best shown in Fig. 4.

This assembly is mounted on a yoke 5 supported on a hollow standard 6 which receives a rod 7 connected at 8 to the center of the thermostat 2. By this means the movement of the thermostat may be communicated to any mechanical mechanism, an example of which will be presently described.

Pivotally connected to the end frames 3 of the thermostat 2, as by screws 9 is the thermostat mask 10 which is composed of two sections, each of which is pivoted independently of the other. Each section of the mask 10 is formed to provide a flat upwardly extending longitudinal masking side 11 and substantially triangular shaped ends 12, the ends 12 of one section overlapping the corresponding ends 12 of the other section, as best shown in Fig. 5. Formed on each of the masking sides 11 is an extension 13 to be grasped by the hand to provide for convenient manual movement and setting of the two sections of the mask 10 with respect to each other.

As will appear from the drawing, the two mask sections may be swung on their pivots 9 so that the top edges of the two sides 11 very closely approach each other so that the thermostat 2 is substantially enclosed by the mask, or they may be swung on their pivots 9 so that the sides 11 fully expose the thermostat 2 or the two sides 11 may be set in various other masking positions.

The assembly as described so far, is applicable for use in connection with mechanical mechanism adapted to be actuated by physical movement of the thermostat due to the heat imparted thereto by the sun's rays. In adaptations for use in connection with electrical devices, the thermostat may be designed to close and open an electrical contact as illustrated in Fig. 6. In this figure, the mask 10 is constructed and arranged as previously described, but the thermostat 2' is located in an open electric circuit 2'' so that upon flexure of the thermostat 2' due to the heat imparted by the sun's rays the electrical contact 2''' is closed and subsequently again opened, as the sun's rays become masked from the thermostat.

In the example of the application of the invention to a sprinkling system, and with particular reference to Fig. 2, the rod 7 which is connected to and actuated by the thermostat 2 may, for example, be a bleed valve rod having on its lower end a bleed valve 14, while the hollow standard 6 may terminate in a valve seat 15. This standard 6 is threaded into a T fitting 16, into which T fitting is also threaded a bleed pipe 17 having a bleed valve seat 18 at its upper termination and within the T fitting 16, which valve seat 18 is directly under and in alignment with the bleed valve 14 on the rod 7. Connecting the T fitting 16 with a pressure cylinder 19 is a water pipe 20, while a horizontal bracket arm 21 mounted on a vertical standard 22 projecting upwardly from the sprinkler water supply pipe 23 supports the assembly in operative position.

Within the pressure cylinder 19 is a cupped piston 24 mounted on a piston rod 25 which passes through a cylinder head 26 and is provided with a toothed rack 27 meshing with a pinion 27' fixedly mounted on a vertical valve stem 28 entering a valve casing 29 through a packing gland 30. The valve 31 is of the conventional threaded faucet type which is rotated down upon its seat 32 to close the port 33 and cut off the flow of water through the water supply pipe 23. Likewise the valve is oppositely rotated to open the port 33 and permit flow of water through the supply pipe 23.

Coiled around the piston rod 25 within the cylinder 19 is a spring 34 of extension strain which bears against the cylinder head 26 and the piston 24 which normally urges the piston to and holds it in the position shown in dotted lines in Fig. 2 and through the instrumentality of the racked piston rod 25 and pinion 27' holds the valve 31 snugly against its seat 32 and shuts off the flow of water through the supply pipe 23.

Having thus described the invention, its operation is as follows:

The thermostat and mask assembly being mounted, as in the example shown in the drawing and just described, the two sections of the mask 10 are adjusted on their pivots 9 so that the rays of the sun, for instance, fall directly on the thermostat 2 when the sun, indicated by the letter S, is at its zenith and directly overhead as indicated in Fig. 1. As the opening between the top longitudinal edges of the two sections of the mask is expanded or contracted, the duration of the sunlight striking the thermostat 2 is controlled. If this opening in the mask be narrow the rays of the sun will strike the thermostat 2 for a short period of time only before the rays are masked from the thermostat 2 by the mask 10 and the thermostat will thereafter be masked for the entire remaining period of sunlight, as for instance when the sun is in position as indicated by S' in Fig. 1.

Likewise if the two sections of the mask 10 are set to provide a wider opening, as for instance as indicated in dotted lines in Fig. 2, the rays of the sun will strike the thermostat 2 considerably before it reaches its zenith and will continue to cast its rays directly upon the thermostat for a considerable period of its passage and for a considerable period of time before its rays become masked from the thermostat.

Likewise the two sections of the mask 10 may be set so that the rays of the sun will strike the thermostat either before or after it has reached its zenith and for any predetermined length of time. When therefore, the device is used in connection with a sprinkling system, as in the example shown in the drawing, such sprinkling system can be caused to be brought into operation at any predetermined time of sunlight and to continue in operation for any predetermined length of time.

The rays of the sun striking the thermostat 2 raises its temperature and causes the instrument to assume an upwardly curved position as shown in dotted lines in Fig. 4. This lifts the bleed valve 14 from its seat 18 (Fig. 2) and permits water from the sprinkler supply pipe 23 to flow through the bleed pipe 17, through the T fitting 16 and pipe 20 into the pressure cylinder 19. The water pressure in the supply pipe 23 which is now being bled into the pressure cylinder 19 being sufficient to overcome the pressure of the coil spring 34 acting against the piston 24, causes the piston to move from its dotted line position and drives the piston rod 25 outwardly of the cylinder 19 which movement results in rotating the valve 31 from its seat 32 through the medium of the rack 27 on the piston rod and the pinion 27' on the valve stem 28. This permits the flow of water through the supply pipe 23 and valve port 33 to the sprinklers 50 diagrammatically shown in Fig. 1.

As soon, however, as the sun's rays become masked from the thermostat 2 and the temperature of the instrument drops to normal, the thermostat again assumes its flat position. This movement depresses the bleed valve 14 against its seat 13 and shuts off the flow of water to the pressure cylinder 19. At the same time that the bleed valve 14 is depressed against its seat 18, the passage 6' in the standard 6 which surrounds the bleed valve stem 7 is uncovered by the bleed valve 14. The coil spring 34 now acts upon the piston 24 to return it to its normal dotted line position and in so doing forces the water which remains in the cylinder 19 and pipe 20 up through and out of the passage 6' which surrounds the valve stem 7 in the standard 6. This movement of the racked valve stem 25 inwardly of the pressure cylinder 19 rotates the pinion 27' on the valve stem 28 to again seat the valve 31 and shut off the flow of water to the sprinklers 50.

Having thus fully described one example of the invention, I claim:

1. A device to be actuated by the sun's rays, which includes a thermostat, and frames for mounting the thermostat, a thermostat mask having two sections, each thermostat mask section having an upstanding longitudinal masking side and ends, the ends of one of the sections overlapping the ends of the other section, means for independently pivoting the mask sections to permit independent movement thereof to cause the masking sides of the mask to mask more or less of the sun's rays from the thermostat to control the interval of time that the thermostat is subjected to the direct rays of the sun and the time of day that the thermostat is subjected to the direct rays of the sun, and an element connected to the thermostat for communicating the movement thereof.

2. A device to be actuated by the sun's rays, which includes a thermostat and means for mounting the same so that it may be subjected to the direct rays of the sun, a thermostat mask having two sections, each including an upstanding longitudinal masking side and ends, means for independently pivoting the two masking sections with relation to each other and with relation to the thermostat, whereby the thermostat may be subjected to the direct rays of the sun for a predetermined period of time and at a predetermined time of day, and an element connected to the thermostat for communicating the movement thereof.

3. In combination, an input pipe feeding an output pipe through a main valve, said main valve being normally held in closed position by resilient biasing means, a piston capable of opening said main valve against said biasing means, a conduit connecting said input pipe to said piston through an auxiliary valve, a temperature responsive element arranged upon exposure to the direct rays of the sun to open said auxiliary valve connecting said input pipe and said piston, said piston turning on said main valve and connecting said input pipe to said output pipe, said temperature responsive element being associated with two masks, each of which includes an up-standing longitudinal masking side, means for independently pivoting the two masking sections with relation to each other and with relation to the temperature responsive element.

RALPH V. HIGGINS.

REFERENCES CITED

The following references are of record in the file of this patent:

UNITED STATES PATENTS

| Number | Name | Date |
|---|---|---|
| 144,493 | Ashcroft | Nov. 11, 1873 |
| 654,009 | Kittinger et al. | July 17, 1900 |
| 687,273 | Schoeffel et al. | Nov. 26, 1901 |
| 785,542 | De May | Mar. 21, 1905 |
| 1,932,408 | Hulse | Oct. 31, 1933 |
| 2,010,305 | Latimer | Aug. 6, 1935 |
| 2,162,524 | Brace | June 13, 1939 |
| 2,266,321 | Holder | Dec. 16, 1941 |
| 2,271,833 | Shipman | Feb. 3, 1942 |
| 2,410,421 | Brady | Nov. 5, 1946 |